(12) United States Patent
Matolia et al.

(10) Patent No.: US 12,022,377 B2
(45) Date of Patent: *Jun. 25, 2024

(54) TRAFFIC ROUTING TOWARDS LOCAL AREA DATA NETWORK PER APPLICATION FUNCTION REQUEST

(71) Applicant: Apple Inc., Cupertino, CA (US)

(72) Inventors: Rohit R. Matolia, Bangalore (IN); Alosious Pradeep Prabhakar, Singapore (SG); Han Pu, Shanghai (CN); Krisztian Kiss, Rancho Santa Fe, CA (US); Mohammed Sadique, Auburn (AU); Srinivasan Nimmala, San Jose, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,400

(22) Filed: Mar. 24, 2023

(65) Prior Publication Data

US 2023/0232311 A1    Jul. 20, 2023

Related U.S. Application Data

(63) Continuation of application No. 17/302,723, filed on May 11, 2021, now Pat. No. 11,678,253.

(30) Foreign Application Priority Data

May 12, 2020   (IN) .............................. 202041020076

(51) Int. Cl.
*H04W 48/06* (2009.01)
*H04W 48/16* (2009.01)
*H04W 48/18* (2009.01)

(52) U.S. Cl.
CPC ........... *H04W 48/06* (2013.01); *H04W 48/16* (2013.01); *H04W 48/18* (2013.01)

(58) Field of Classification Search
CPC ...... H04W 48/06; H04W 48/16; H04W 48/18
See application file for complete search history.

(56) References Cited

U.S. PATENT DOCUMENTS

| 11,678,253 B2 * | 6/2023 | Matolia ................. H04W 36/12 370/329 |
| 2019/0261260 A1 | 8/2019 | Dao et al. |

FOREIGN PATENT DOCUMENTS

| CN | 109995844 | 7/2019 |
| CN | 110167003 | 8/2019 |

(Continued)

*Primary Examiner* — Diane D Mizrahi
(74) *Attorney, Agent, or Firm* — Fay Kaplun & Marcin, LLP

(57) ABSTRACT

A cellular network includes a first network component configured to i) identify a first session between a first data network and a user equipment (UE), wherein the first session corresponds to a first session management function (SMF), ii) receive data network access information (DNAI) from a network function, the DNAI corresponding to a second data network and iii) select a second SMF that is to be utilized for a second session between the second data network and the UE. The cellular network also includes a second network component configured to i) store a mapping between the DNAI and the second SMF and ii) transmit an indication of the second SMF to the first network component, wherein the first network component selects the second SMF based on the indication.

20 Claims, 12 Drawing Sheets

(56) References Cited

FOREIGN PATENT DOCUMENTS

| | | |
|---|---|---|
| CN | 110547003 | 12/2019 |
| CN | 110650504 | 1/2020 |

* cited by examiner

Network Arrangement 100

TRAFFIC ROUTING TOWARDS LOCAL AREA DATA NETWORK PER APPLICATION FUNCTION REQUEST

BACKGROUND

Edge computing refers to performing computing and data processing at the network where the data is generated. This allows performance to be optimized and latency to be minimized. Edge computing is a distributed approach where data processing is localized.

A 5G new radio (NR) network may be equipped with edge computing capability. One aspect of edge computing within the context of 5G NR is local access to data networks. Local access generally relates to routing traffic to a data network that is near the location of the end user, e.g., a local area data network. This improves latency by shortening the distance in which data has to travel within the 5G NR network.

To route traffic towards a local area data network, the relevant network functions may be configured with data network access information (DNAI) for the requested data network. However, under conventional circumstances, network functions may not be configured with the DNAI for the requested data network.

SUMMARY

Some exemplary embodiments are related to a method performed by an access and mobility management function (AMF) of a cellular network. The method includes identifying a first session between a first data network and a user equipment (UE), wherein the first session corresponds to a first session management function (SMF), receiving data network access information (DNAI) from a network function, the DNAI corresponding to a second data network and selecting a second SMF that is to be utilized for a second session between the second data network and the UE.

Other exemplary embodiments are related to a cellular network that includes multiple network components. A first network component is configured to i) identify a first session between a first data network and a user equipment (UE), wherein the first session corresponds to a first session management function (SMF), ii) receive data network access information (DNAI) from a network function, the DNAI corresponding to a second data network and iii) select a second SMF that is to be utilized for a second session between the second data network and the UE. A second network component is configured to i) store a mapping between the DNAI and the second SMF and ii) transmit an indication of the second SMF to the first network component, wherein the first network component selects the second SMF based on the indication.

DETAILED DESCRIPTION

Figure 1:
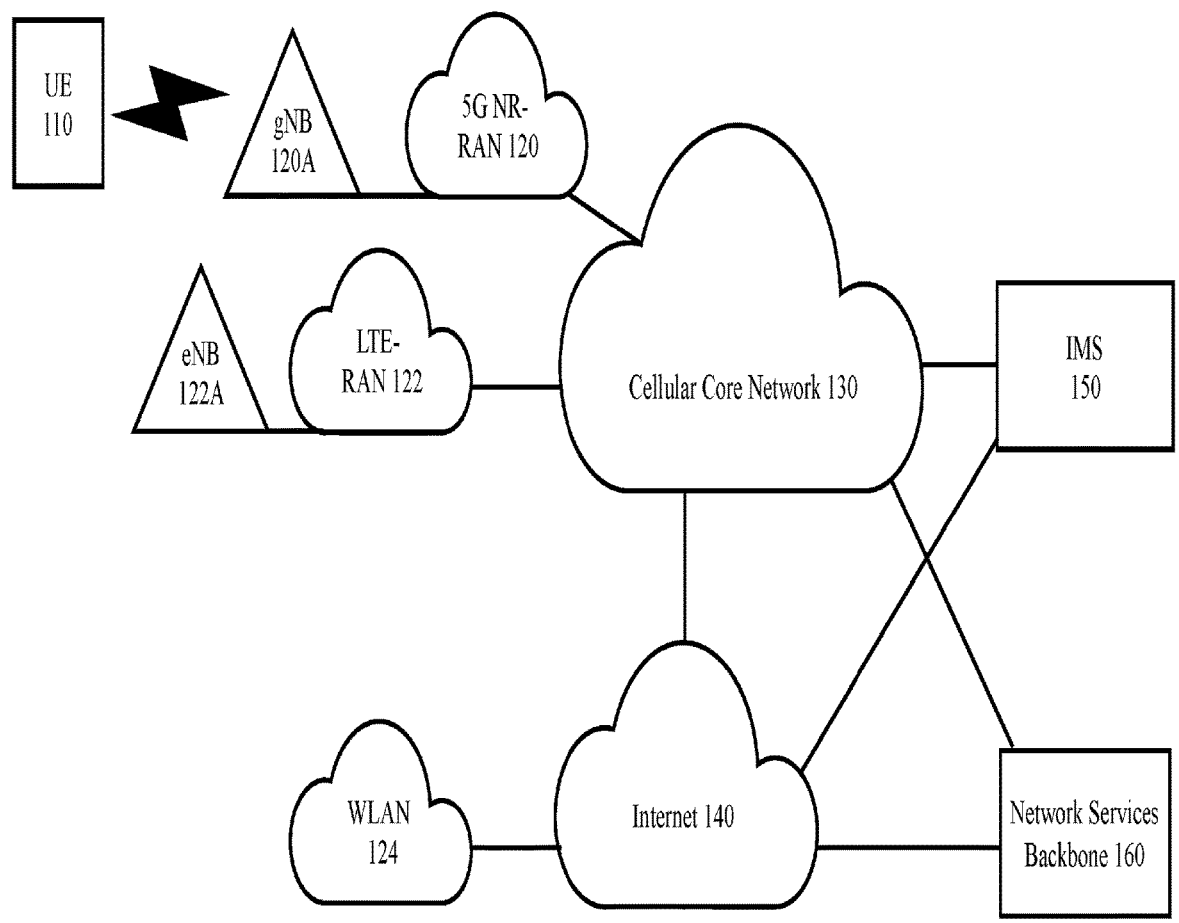
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to routing traffic towards a local area data network.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

In addition, the exemplary embodiments are described with regard to a 5G New Radio (NR) cellular network. However, reference to a 5G NR network is merely provided for illustrative purposes. The exemplary embodiments may be utilized with any network that implements the functionalities described herein for edge computing. Therefore, the 5G NR network as described herein may represent any network that includes the functionalities associated with edge computing.

The exemplary embodiments relate to edge computing within the 5G NR network. One aspect of edge computing within the context of 5G NR is local access to a data network. The term "local access" generally refers to routing traffic to a data network that is at or near the edge of the 5G NR network. This improves latency by shortening the distance in which data has to travel within the 5G NR network. However, reference to local access is merely provided for illustrative purposes. Different entities may refer to a similar concept by a different name.

The exemplary embodiments are described with regard to configuring the UE with a packet data unit (PDU) session. Those skilled in the art will understand that a PDU session generally refers to a logical connection between the UE and a data network. Throughout this description, the term "local area data network" refers to a data network that is located near the UE within the context of a 5G NR. The exemplary embodiments will include mechanisms implemented on the network side for configuring the UE with a PDU session to a local area data network. This may include establishing a new PDU session or modifying an existing PDU session.

As indicated above, one issue with conventional edge computing in 5G NR is that a network function may not be configured with the data network access information (DNAI) for a particular data network. Without the DNAI, traffic may not be routed to the corresponding data network and thus, a PDU session may not be established. The exemplary embodiments relate to providing the DNAI for a requested data network to one or more relevant network components to enable traffic routing to the requested data network.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.). Further details of the 5G NR-RAN 120 will be provided below.

The base stations (e.g., the gNB 120A, the eNB 122A) may include one or more communication interfaces to exchange data and/or information with camped UEs, the corresponding RAN, the cellular core network 130, the internet 140, etc. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). As mentioned above, the use of the 5G NR-RAN 120 is for illustrative purposes and any type of network may be used.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2A:
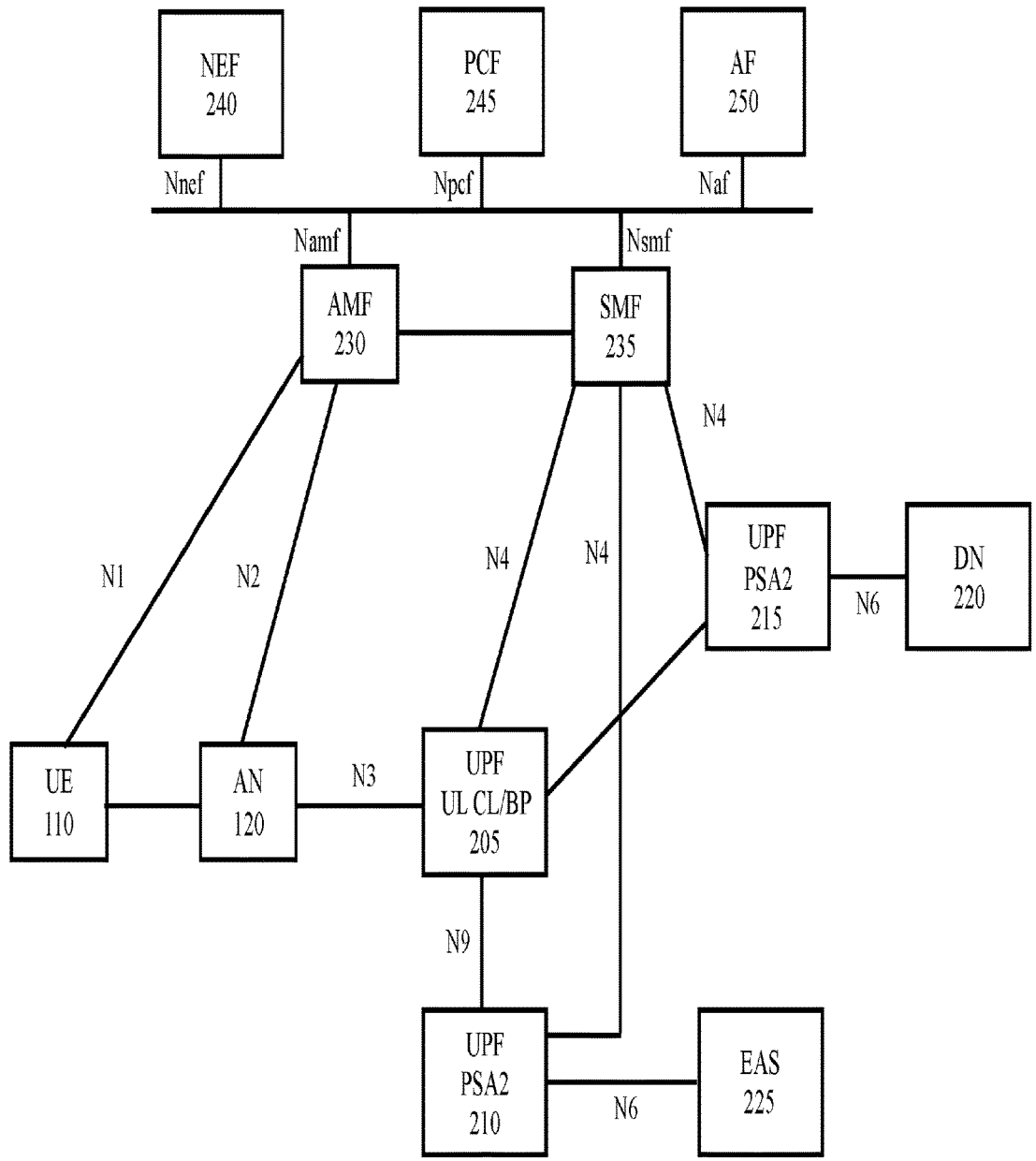
FIG. 2A shows a first exemplary architecture arrangement of an edge computing architecture that includes accessing edge application servers (EASs) via Uplink (UL) classifiers (CL) and Branching Points (BP) according to various exemplary embodiments described herein.

FIG. 2A shows a first exemplary architecture arrangement 200 of an edge computing architecture that includes accessing edge application servers (EASs) via Uplink (UL) classifiers (CL) and Branching Points (BP) according to various exemplary embodiments described herein. The following will provide a general overview of the various components of the exemplary architecture arrangement 200. However, specific operations performed by the components with respect to the exemplary embodiments will be described in greater detail below when describing the exemplary embodiments. It should also be understood that the components of exemplary architecture arrangement 200 may reside in various physical and/or virtual locations as described above with respect to FIG. 1. These locations may include, within the access network (e.g., within the 5G NR-RAN 120), within the core network 130, as a separate component outside of the locations described with respect to FIG. 1, etc.

In addition, in FIG. 2A, the various components are shown as being connected via connections labeled Nx (e.g., N1, N2, N3, N6, N9, etc.). Those skilled in the art will understand that each of these connections (or interfaces) are defined in the 3GPP Specifications. The exemplary architecture arrangement 200 is using these connections in the manner in which they are defined in the 3GPP Specifications. Furthermore, while these interfaces are termed connections throughout this description, it should be understood that these interfaces are not required to be direct wired or wireless connections, i.e., the interfaces may communicate via intervening hardware and/or software components. To provide an example, the UE 110 exchanges communications with the gNB 120A. However, in the architecture arrangement 200 the UE 110 is shown as having a connection to the Access and Mobility Management Function (AMF) 230 within the core network 130. This connection or interface is not a direct communication link between the UE 110 and the AMF 230, but is a connection that is facilitated by intervening hardware and software components. Thus, throughout this description the terms "connection" and "interface" may be used interchangeably to describe the Nx interfaces between the various components.

The architecture arrangement 200 includes the UE 110 and the access network (AN) 120 (e.g., the 5G NR-RAN 120). The AN 120 is connected to a first User Plane Function (UPF) 205. The UPF 205 performs various functions within the core network 130 including packet routing and forwarding. In this example, the UPF 205 includes the UL CL/BP functionality. In general, the UL CL functionality may refer to providing destination based multihoming for load balancing, while BP may refer to forwarding UL traffic to different PDU Session Anchors (PSA). The first UPF 205 is further connected to a second UPF 210 and a third UPF 215. The second UPF 210 and third UPF 215 include the PSA functionality. The third UPF 215 connects to the data network (DN) 220.

In this exemplary embodiment, the second UPF 210 connects to the local EASs 225. Those skilled in the art will understand that the EAS 225 may comprise one or more EASs as will be described in greater detail below. In addition, those skilled in the art will understand that a network may include one or more additional UPFs (not shown) that each connect to one or more additional EASs (not shown).

In addition to the connections described above, the UE 110 and the AN 120 may also be connected to the AMF 230. The AMF 230 is generally responsible for mobility management in the 5G NR-RAN 120. For example, the AMF 230 may be responsible for managing handovers between gNBs. In another example, the AMF 230 may be capable of storing information related to ongoing sessions. In a further example, the AMF 230 may be configured to modify and create a session from a first SMF to a second SMF. The UPFs 205-215 may also include a connection to a Session Management Function (SMF) 235. The SMF 235 may be generally responsible for creating, updating and removing Protocol Data Unit (PDU) sessions for UEs. In this example, the SMF 235 is configured to store information related to paths to other SMFs (or intermediate SMFs (I-SMF)).

The exemplary architecture arrangement 200 further includes a Network Exposure Function (NEF) 240. The NEF 240 is generally responsible for securely exposing the services and capabilities provided by 5G NR-RAN 120 network functions. The exemplary architecture arrangement 200 further includes a Positioning Calculation Function (PCF) 245. The PCF 245 is generally responsible for determining the position of the UE 110. The exemplary architecture arrangement 200 also further includes an application function (AF) 250. The AF 250 may be considered a logical element that provides session related information.

Figure 2B:
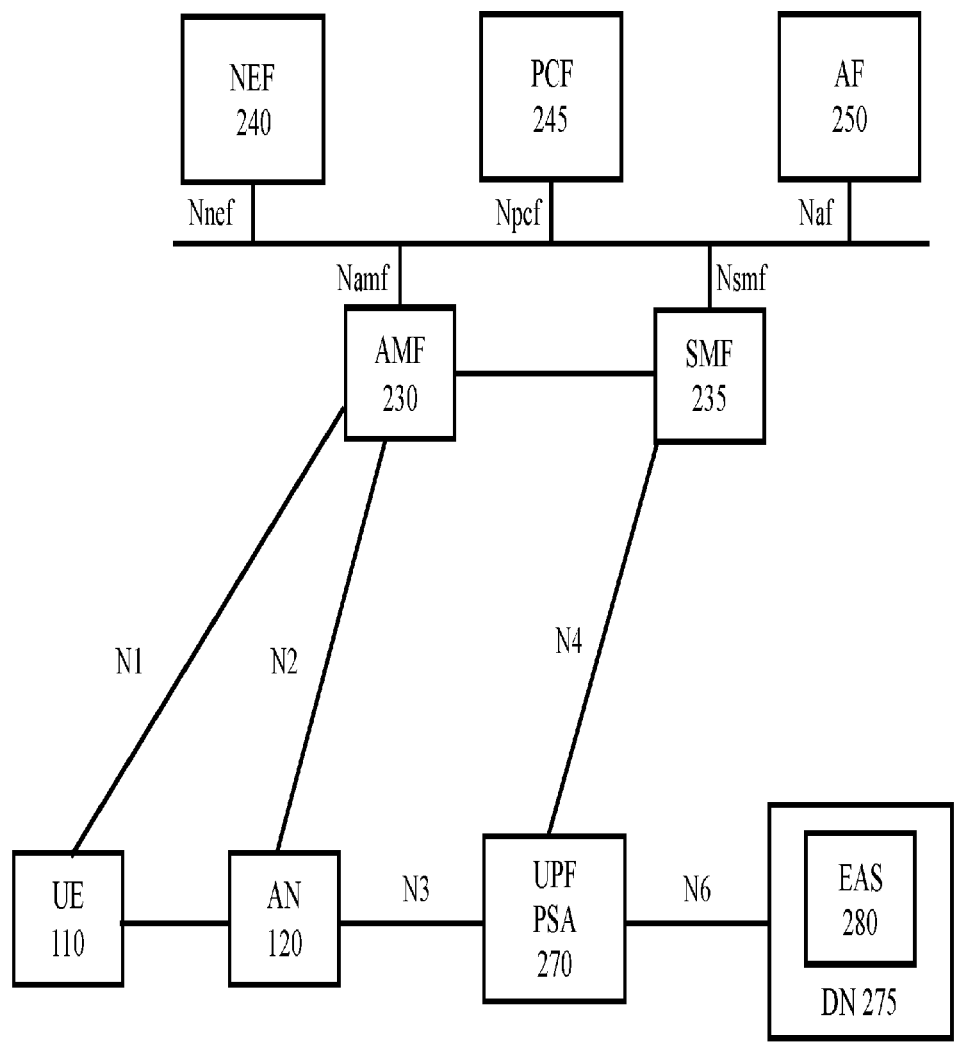
FIG. 2B shows a second exemplary architecture arrangement of an edge computing architecture that does not include accessing EASs via UL CL/BP according to various exemplary embodiments described herein.

FIG. 2B shows a second exemplary architecture arrangement 260 of an edge computing architecture that does not include accessing EASs via UL CL/BP according to various exemplary embodiments described herein. Thus, in this exemplary architecture arrangement 260, there is no UPF that includes the UL CL/BP functionality (e.g., the UPF 205 of FIG. 2A). In the exemplary architecture arrangement 260, the AN 120 is connected to the UPF 270 that includes the PSA functionality. The UPF 270 is connected to the DN 275 that includes the EASs 280. Similar to the architecture arrangement 200, those skilled in the art will understand that the DN 275 may comprise one or more EASs 280 and that a network may include one or more additional UPFs (not shown) that each connect to one or more additional DNs having one or more EASs (not shown). The remaining components are the same as was described with respect to the architecture arrangement 200 and will not be described again.

The arrangements 200 and 260 as shown and described with reference to FIGS. 2A and 2B, respectively, are intended to provide two exemplary arrangements of edge computing architecture in which the exemplary embodiments may be implemented. However, it should be understood that there may be other edge computing architectures with which the exemplary embodiments may be implemented. Further, as described above, the description related to FIGS. 2A and 2B is only intended to provide a general overview of the components in the various arrangements. Exemplary operations performed by the components in implementing the exemplary embodiments will be provided below.

The exemplary embodiments are described with regard to the following exemplary scenario. Initially, the UE 110 is configured with a PDU session to a first data network. During operation, the serving AF may initiate a request for a data network change. To provide the UE 110 with local access to the requested data network, the serving network functions (e.g., SMF, I-SMF, etc.) may need to be provisioned with the DNAI of the requested data network. As will be described in more detail below, the exemplary embodiments include various mechanisms for providing the relevant network functions with the requested DNAI to enable local access to the requested data network.

Figure 3:
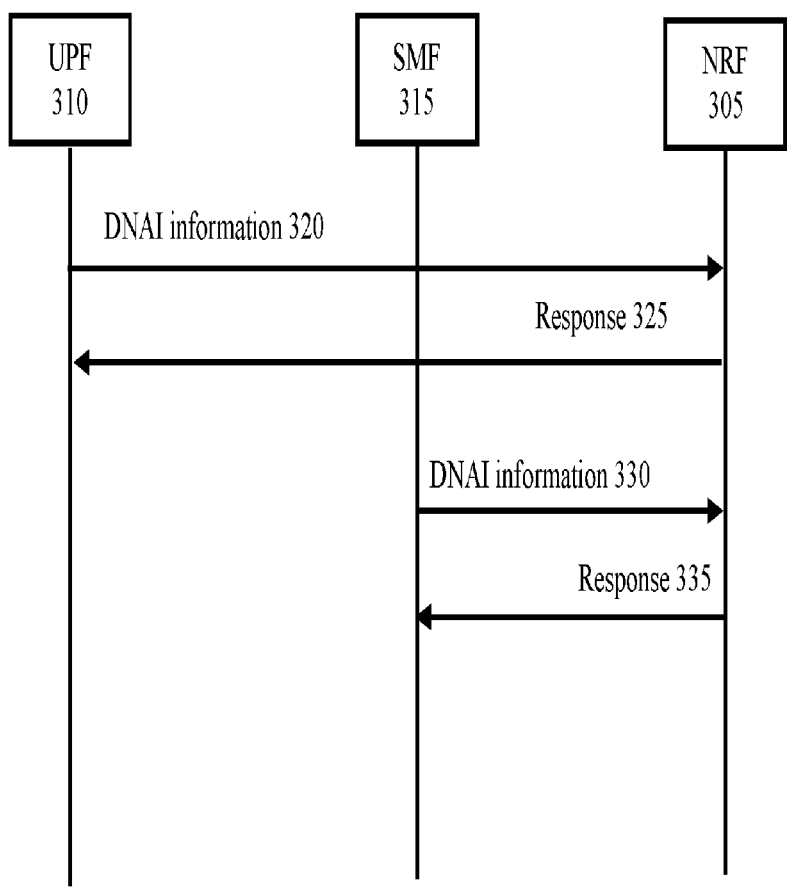
FIG. 3 shows an exemplary signaling diagram for provisioning a network repository function (NRF) with DNAI according to various exemplary embodiments.

FIG. 3 shows an exemplary signaling diagram 300 for provisioning a network repository function (NRF) 305 with DNAI according to various exemplary embodiments. Those skilled in the art will understand that the NRF 305 may perform operations related to network service discovery functionality which allows network functions to determine where and how to access other network functions. As will be described after the description of the signaling diagram 300, the NRF 305 may provide DNAI and other information to an AMF during SMF selection which may occur when configuring local access to the requested data network.

The signaling diagram 300 includes the NRF 305, a UPF 310 and an SMF 315. In 320, the UPF 310 transmits DNAI information to the NRF 305. For example, the UPF 310 may register with the NRF 305 using a Nnrf_NFManagement_NFRegister message. This message may be configured to include a list of DNAI supported by the UPF 310 and the SMF area IDs that may be served by the UPF 310. In some embodiments this message may be transmitted directly to the NRF 305. In other embodiments, this message may be transmitted indirectly to the NRF 305 via a connected SMF (e.g., SMF 315).

In 325, the NRF 305 may transmit a response to the DNAI information. For example, the NRF 305 may transmit a create session response to the UPF 310 in response to the Nnrf_NFManagement_NFRegister message. This signaling exchange may occur in accordance with currently existing UPF management procedures or future implementations of UPF management procedures.

In 330, the SMF 315 transmits DNAI information to the NRF 305. For example, the SMF 315 may register with the NRF 305 using a Nnrf_NFManagement_NFRegister message. This message may be configured to include PSA information, an SMF area ID and a list of DNAI that the SMF 315 may provide services to. In 325, the NRF 305 may transmit a response to the DNAI information. For example, the NRF 305 may transmit a Nnrf_NFmanagement_NFregister response.

Various UPFs and SMFs may provide the NRF 305 with DNAI information using a signaling exchange similar to the signaling diagram 300 described above. In some embodiments, the NRF 305 may periodically synchronize with the network in accordance with a schedule or a timer to collect DNAI information from any newly added UPFs and SMFs. In other embodiments, the NRF may synchronize with the network in response to a predetermined condition (e.g., user input, a signal received from another network component, an indication of a newly added network function, etc.) to collect DNAI information from any newly added UPFs and SMFs. Thus, the NRF 305 may possess context information relevant to DNAI information. This context information may include a mapping of the UPFs to SMF area IDs and a mapping of SMFs to respective DNAI. The NRF 305 may possess this context information for one or more public land mobile networks (PLMNs). As will be described below, the NRF 305 may then provide this information to other network functions (e.g., AMF) for SMF selection when configuring access to the requested local area data network.

Figure 4:
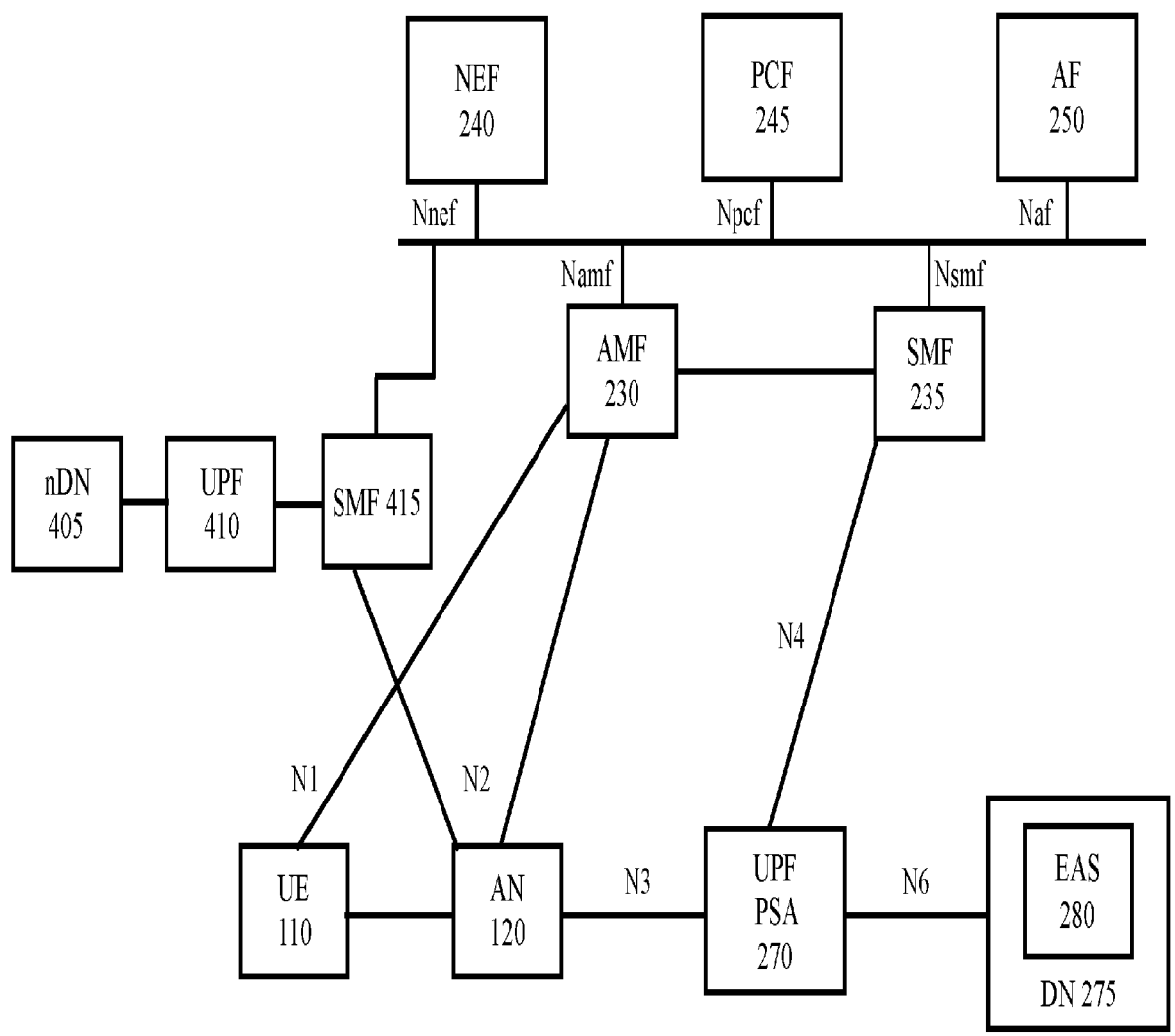
FIG. 4 shows an exemplary architecture arrangement according to various exemplary embodiments.

The following signaling diagrams 500-700 will be described with regard to the exemplary scenario mentioned above where the AF requests a data network change. The architecture arrangement 400 shown in FIG. 4 illustrates this exemplary scenario with regard to the architecture arrangement 260 of FIG. 2B. For example, consider a scenario in which the UE 110 is initially configured with a PDU session using the architecture arrangement 260 of FIG. 2B. Subsequently, the AF 250 request a data network change from the DN 275 to the new data network (nDN 405). The nDN 405 is served by UPF 410 and SMF 415. Those skilled in the art will understand the interfaces with which the nDN 405, UPF 410 and SMF 415 may utilize to connect to one another and the other network components of the architecture arrangement 260.

Figure 5:
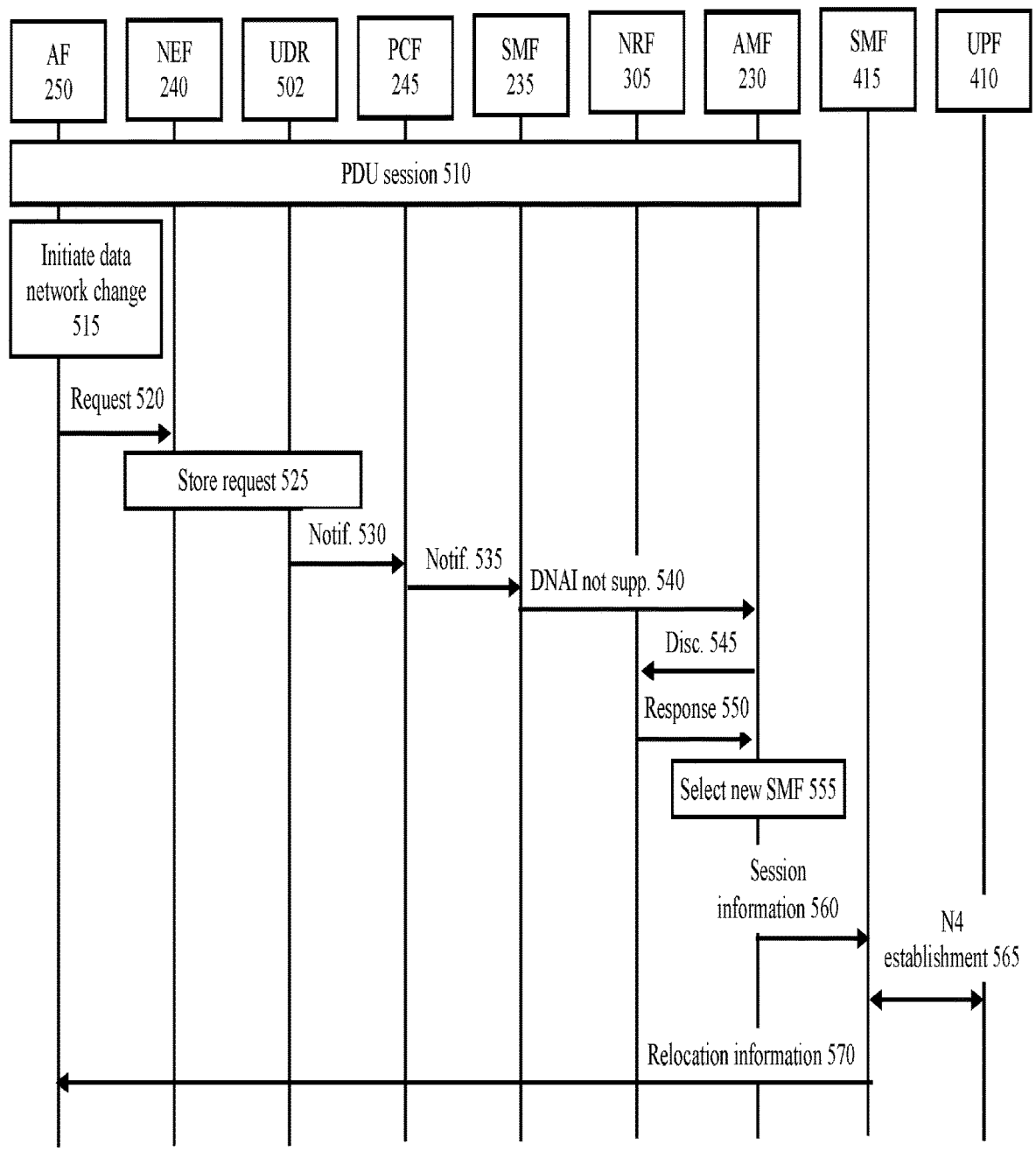
FIG. 5 shows a signaling diagram for a data network change that includes a SMF change initiated by the SMF according to various exemplary embodiments.

FIG. 5 shows a signaling diagram 500 for a data network change that includes a SMF change initiated by the SMF according to various exemplary embodiments. The signaling diagram 500 will be described with regard to the architecture arrangement 400 of FIG. 4.

The signaling diagram 500 includes the AF 250, the NEF 240, a unified data repository (UDR) 502, the PCF 245, the SMF 235, the NRF 305, the AMF 230, the SMF 415 and the UPF 410.

In 510, there is a PDU session in progress. From the perspective of the AF 250 the PDU session may be between the UE 110 and the DN 275. The control plane of the PDU session may be served by various network components including the SMF 235 and the AMF 230.

In 515, the AF 250 initiates a request for a data network change related to the ongoing PDU session of 510. In this example, the data network change is requested for the nDN 405 and thus, the request may include DNAI associated with the nDN 405. However, an actual request may be for multiple data networks and thus, contains a list of DNAI. The basis on which the data network change request is initiated is beyond the scope of the exemplary embodiments. The exemplary embodiments apply to this request being initiated for any appropriate reason.

In 520, the AF 250 may transmit a request to the NEF 240. For example, the AF 250 may transmit a Nnef_trafficinfluence_create request to the NEF 240 that includes information such as, but not limited to, one or more DNAI (e.g., the DNAI associated with the nDN 405), an AF service ID, an application identifier and an indication of a relocation possibility.

In 525, the request received from the AF 250 is stored locally at the NEF 240 and/or the UDR 502. In 530, the UDR 502 sends a notification message to the PCF 245. For example, the UDR 502 may send a Nudr_DM_Notify message that includes the requested one or more DNAI, the AF service ID and the application identifier. Those skilled in the art will understand that the UDR 502, the PCF 245, AMF 230 and SMF 235 may be subscribed for information exchange prior to the signaling described in the signaling diagram 500.

In 535, the PCF 245 transmits a policy control notification to the SMF 235. The policy control notification may include the requested one or more DNAI, the AF session ID and the application identifier.

The SMF 235 may use this information to determine whether the SMF 235 is capable of routing a session to the requested DNAI. In this example, it is assumed that the SMF 235 is not currently configured with the requested DNAI. Thus, when the SMF 235 receives the policy control notification it may identify that it is not configured with the DNAI requested by the AF 250.

In 540, the SMF 235 indicates to the AMF 230 that the SMF 235 is not configured with the requested DNAI. For example, the SMF 235 may transmit a Nsfm_event_exposure_notify message to the AMF 230 indicating that the ongoing PDU session needs to be modified or a new PDU session is to be created to facilitate a user plane path change to the nDN 405. This message may include a PDU session ID and the requested DNAI.

In 545, the AMF 230 initiates network function discovery with the NRF 305. The request may include the requested DNAI. The NRF 305 may then determine a SMF that can handle the current context along with the requested DNAI. For example, as described above with regard to FIG. 3 the NRF 305 may possess a mapping between AMF, SMF and DNAI. Thus, the NRF 305 may check a mapping table and in 550 provide a response to the AMF 230 that identifies a SMF that can handle the current context along with the requested DNAI. In this example, the AMF 230 identifies the SMF 415.

In 555, the AMF 230 selects the new SMF (e.g. SMF 415) based on the information requested from the NRF 305. In 560, the AMF 230 may transmit session information to the selected SMF 415. For example, the AMF 230 may transmit a Nsmf_eventexposure subscribe message. This message may include information related to the previous session from the SMF 325, a session establishment indication and a data network name (DNN) ID. This transfers the active PDU session from the SMF 235 to the SMF 415. This may include modifying the ongoing PDU session or creating a new PDU session.

In 565, the SMF 415 and the UPF 410 perform a signaling exchange to establish a N4 session. In 570, the SMF 415 transmits application relocation information to the AF 250. For example, the SMF 415 may transmit a Nsmf_eventexposure_apprelocationinfo message to the AF 250 that includes a PDU session ID and the DNAI associated with the nDN 405. If a new PDU session is established additional signaling may be performed to update the AF 250 and other network functions with the new session information and a release of the old PDU session.

Figure 6:
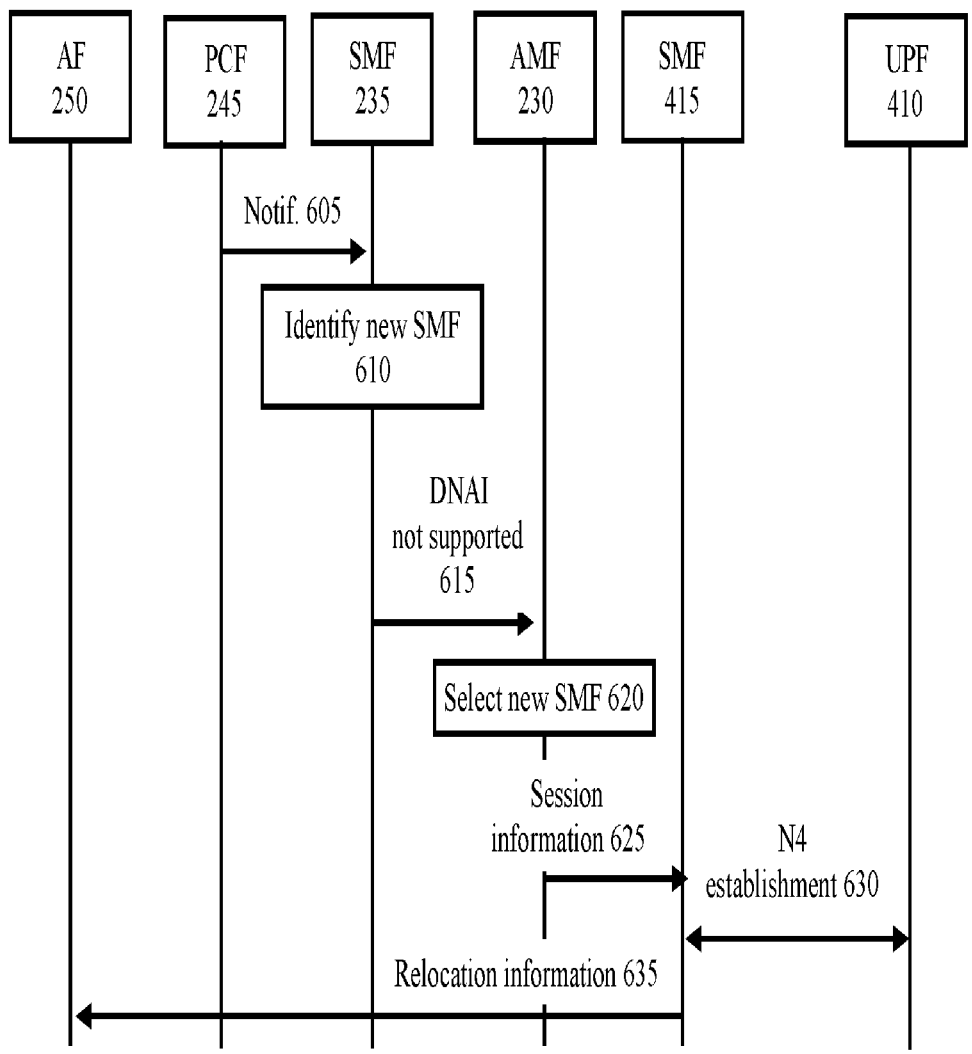
FIG. 6 shows a signaling diagram for a data network change that includes a SMF change initiated by the SMF according to various exemplary embodiments.

FIG. 6 shows a signaling diagram 600 for a data network change that includes a SMF change initiated by the SMF according to various exemplary embodiments. The signaling diagram 600 will be described with regard to the architecture arrangement 400 of FIG. 4 and the signaling diagram 500 of FIG. 5.

The signaling diagram 600 relates to a scenario substantially similar to the scenario illustrated in the signaling diagram 500. However, in this example, the SMF 235 is connected to the SMF 415. As will be described below, the SMF 235 may select the SMF 415 based on this information and thus, the NRF 305 may not be queried.

The signaling diagram 600 begins with 535 of the signaling diagram 500 and does not include a discovery and response with the NRF 305. Thus, only the AF 250, the PCF 245, the SMF 235, the AMF 230, the SMF 415 and the UPF 410 are illustrated in the signaling diagram 600.

In 605, the PCF 245 transmits a policy control notification to the SMF 235. This is substantially similar to the 535 of the signaling diagram 500.

In 610, the SMF 235 identifies a new SMF (e.g., SMF 415) that may be used for the requested DNAI. For example, as indicated above the SMF 235 and the SMF 415 may be connected. Thus, the SMF 235 may be aware that the SMF 415 can handle the current context along with the requested DNAI.

In 615, the SMF 235 indicates to the AMF 230 that the SMF 235 is not configured with the requested DNAI. For example, like in 540 of the signaling diagram 500, the SMF 235 may transmit a Nsfm_event_exposure_notify message to the AMF 230 indicating that the ongoing PDU session needs to be modified or a new PDU session is to be created to facilitate a user plane path change to the nDN 405. In contrast to 540, the message in 615 may include information corresponding to the selected SMF (e.g., SMF 415).

In 620, the AMF 230 selects the new SMF (e.g. SMF 415) based on the information received from the SMF 235. In some embodiments, the SMF 235 may automatically release the session and transfer the context to the new SMF 415 via the AMF 230. In other embodiments, the SMF 415 can request the SMF 235 to release the session and provide the context information.

In 625, the AMF 230 may transmit session information to the selected SMF 415. This is substantially similar to 560 of the signaling diagram 500. In 630, the SMF 415 and the UPF 410 perform a signaling exchange to establish a N4 session. This is substantially similar to 565 of the signaling diagram 500. In 635, the SMF 415 transmits application relocation information to the AF 250. This is substantially similar to 570 of the signaling diagram 500. As mentioned above, if a new PDU session is established additional signaling may be performed to update the AF 250 and other network functions with the new session information and a release of the old PDU session.

Figure 7:
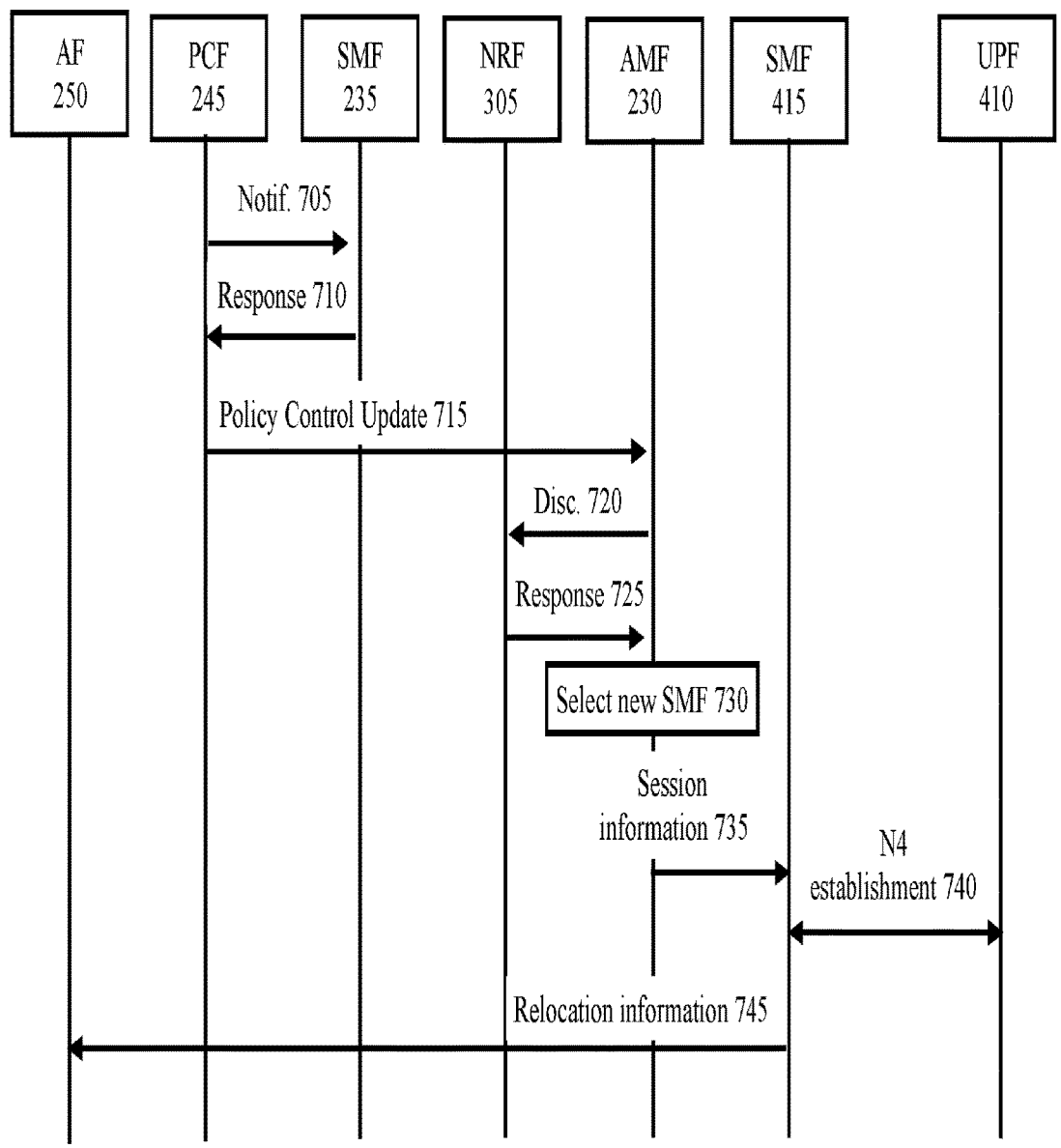
FIG. 7 shows a signaling diagram for a data network change that includes a SMF change initiated by the PCF according to various exemplary embodiments.

FIG. 7 shows a signaling diagram 700 for a data network change that includes a SMF change initiated by the PCF according to various exemplary embodiments. The signaling diagram 700 will be described with regard to the architecture arrangement 400 of FIG. 4 and the signaling diagram 500 of FIG. 5.

The signaling diagram 700 relates to a scenario substantially similar to the scenario illustrated in the signaling diagrams 500-600. However, in this example, the PCF 245 initiates the SMF change.

The signaling diagram 700 occurs after 505-530 of the signaling diagram 500. Thus, only the AF 250, the PCF 245, the SMF 235, the NRF 305, the AMF 230, the SMF 415 and the UPF 410 are illustrated in the signaling diagram 700.

As described above, in 530 the UDR 502 sends a notification message to the PCF 245. For example, the UDR 502 may send a Nudr_DM_Notify message that includes the requested one or more DNAI, the AF service ID and the application identifier.

In 705, the PCF 245 transmits a policy control notification to the SMF 235. The policy control notification may include the requested DNAI. In 710, the SMF 235 sends a response indicating that the SMF 235 is not configured to support a session with the requested DNAI.

In 715, the PCF 245 transmits a policy control update to the AMF 230. This message may include the requested DNAI and a request to relocate the session to a new SMF.

In 720, the AMF 230 initiates network function discovery with the NRF 305. For example, based on the message received from the PCF 245 the AMF 230 may assume that the SMF 235 cannot handle a session on the requested DNAI. This may trigger the AMF 230 initiate SMF discovery. The discovery request may include the requested DNAI. The NRF 305 may then determine a SMF that can handle the current context along with the requested DNAI. For example, as described above with regard to FIG. 3 the NRF 305 may possess a mapping between AMF, SMF and DNAI. Thus, the NRF 305 may check a mapping table.

In 725, the NRF 305 transmits a response to the AMF 230 that identifies a SMF that can handle the current context along with the requested DNAI. In this example, the AMF 230 identifies the SMF 415.

In 730, the AMF 230 selects the new SMF (e.g. SMF 415) based on the information received from the NRF 305. In 735, the AMF 230 may transmit session information to the selected SMF 415. This is substantially similar to 560 of the signaling diagram 500. In 740, the SMF 415 and the UPF 410 perform a signaling exchange to establish a N4 session. This is substantially similar to 565 of the signaling diagram 500. In 745, the SMF 415 transmits application relocation information to the AF 250. This is substantially similar to 570 of the signaling diagram 500. As mentioned above, if a new PDU session is established additional signaling may be performed to update the AF 250 and other network functions with the new session information and a release of the old PDU session.

The following exemplary embodiments will be described with regard to enhancing topology of SMF and UPF in 5G networks (ETSUN). ETSUN is a use case that includes intermediate SMF (I-SMF). The I-SMF may be used for PDU session continuity. For example, an I-SMF may be inserted between an AMF and an SMF to maintain a PDU session. The I-SMF may also perform operations related to selecting and controlling UPFs.

Figure 8:
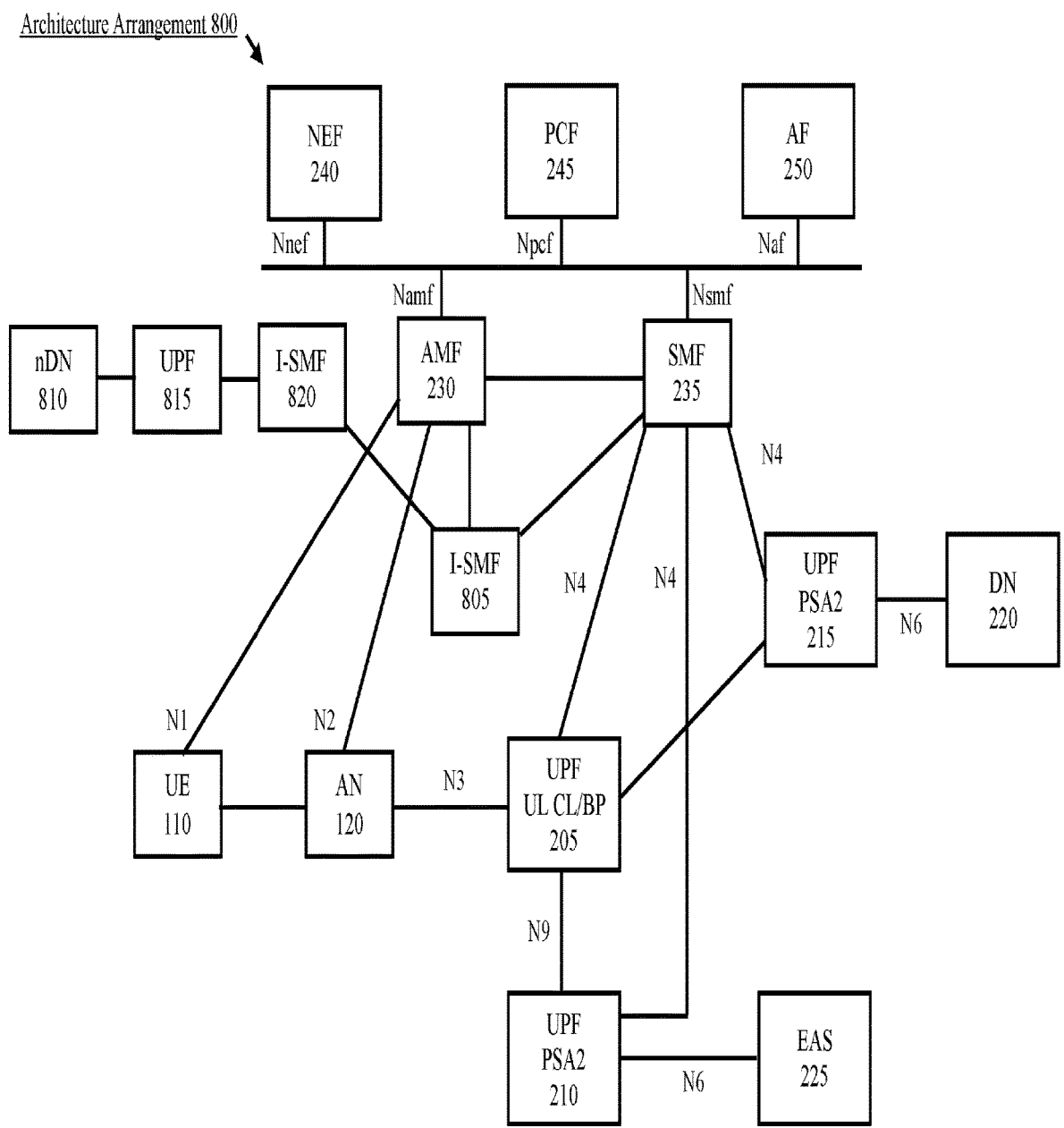
FIG. 8 shows an exemplary architecture arrangement according to various exemplary embodiments.

The following signaling diagrams 900-1000 will be described with regard to the exemplary scenario mentioned above where the AF requests a data network change. In contrast to signaling diagrams 500-700, an I-SMF is included in the architecture. The architecture arrangement 800 shown in FIG. 8 illustrates this exemplary scenario with regard to the architecture arrangement 200 of FIG. 2A. For example, consider a scenario in which the UE 110 is initially configured with a PDU session using the architecture arrangement 200 of FIG. 2A and an I-SMF 805. Subsequently, the AF 250 request a data network change from the DN 220 to the new data network (nDN 810). The nDN 405 is served by UPF 815 and an I-SMF 820. Those skilled in the art will understand the interfaces with which the I-SMF 805, the nDN 810, UPF 415 and I-SMF 820 may utilize to connect to one another and the other network components of the architecture arrangement 200.

Figure 9:
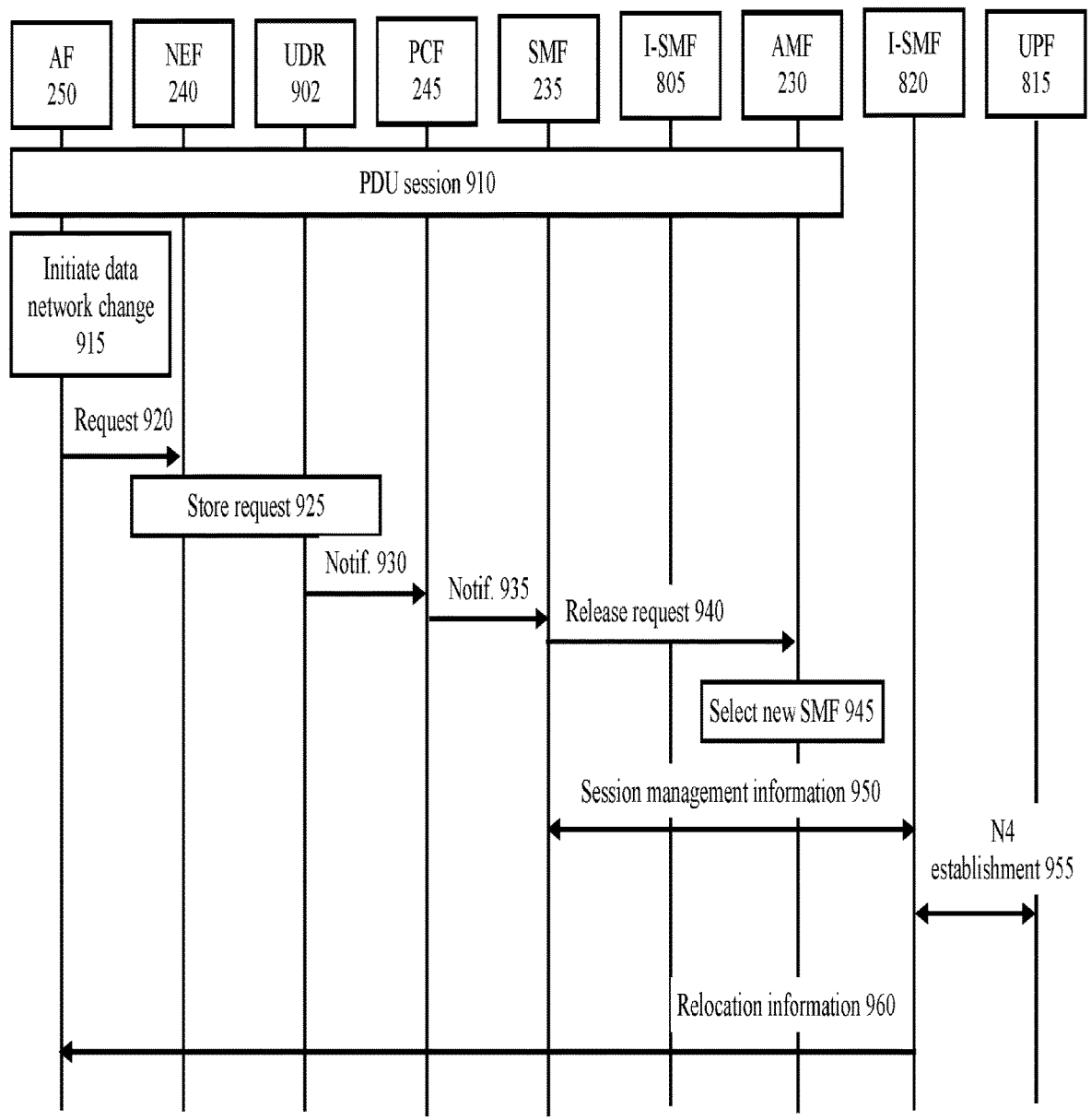
FIG. 9 shows a signaling diagram for a data network change that includes an intermediate SMF (I-SMF) change initiated by the SMF according to various exemplary embodiments.

FIG. 9 shows a signaling diagram 900 for a data network change that includes an I-SMF change initiated by the SMF according to various exemplary embodiments. The signaling diagram 900 will be described with regard to the architecture arrangement 800 of FIG. 8.

The signaling diagram 900 includes the AF 250, the NEF 240, a UDR 902, the PCF 245, the SMF 235, I-SMF 805, the AMF 230, the I-SMF 820 and the UPF 815. Thus, in contrast to the signaling diagrams 500-700 the NRF 305 is not utilized.

In 910, there a PDU session is in progress. From the perspective of the AF 250 the PDU session may be between the UE 110 and the DN 220. The control plane of the PDU session may be served by various network components including the SMF 235, the I-SMF 805 and the AMF 230.

In 915, the AF 250 initiates a request for a data network change related to the ongoing PDU session of 910. In this example, the data network change is requested for the nDN 810 and thus, the request may include DNAI associated with the nDN 810. However, an actual request may be for multiple data networks and thus, contains a list of DNAI. The basis on which the data network change request is initiated is beyond the scope of the exemplary embodiments. The exemplary embodiments apply to this request being initiated for any appropriate reason.

In 920, the AF 250 may transmit a request to the NEF 240. For example, the AF 250 may transmit a Nnef_trafficinfluence_create request to the NEF 240 that includes information such as, but not limited to, one or more DNAI (e.g., the DNAI associated with the nDN 810), an AF service ID, an application identifier and an indication of a relocation possibility.

In 925, the request received from the AF 250 is stored locally at the NEF 240 and/or the UDR 902. In 930, the UDR 902 sends a notification message to the PCF 245. For example, the UDR 902 may send a Nudr_DM_Notify message that includes the requested one or more DNAI, the AF service ID and the application identifier. Those skilled in the art will understand that the UDR 902, the PCF 245, AMF 230, SMF 235 and the I-SMF 805 may be subscribed for information exchange prior to the signaling described in the signaling diagram 900.

In 935, the PCF 245 transmits a policy control notification to the SMF 235. The policy control notification may include the requested one or more DNAI, the AF service ID and the application identifier.

The SMF 235 may use this information to determine whether the SMF 235 and the I-SMF 805 are capable of routing a session to the requested DNAI. In this example, it is assumed that the SMF 235 and the I-SMF 805 are not currently configured with the requested DNAI. Thus, when the SMF 235 receives the policy control notification it may identify that the SMF 235 and the I-SMF 805 are not configured with the DNAI requested by the AF 250.

In 940, the SMF 235 transmits a request to the AMF 230. This request may be for a release of the I-SMF 805 PDU session with a user plane path change. This request may also include a new I-SMF ID. That is, since the SMF 235 is connected to the I-SMF 820, the SMF 235 is aware that the I-SMF 820 is capable of handling the requested DNAI. In some embodiments, this request may be a Nsfm_event_exposure message.

In 945, the AMF 230 selects the new I-SMF (e.g. I-SMF 820) based on the information received from the SMF 235. In 950, the I-SMF 820 performs a signaling exchange with the SMF 235. This may include a session management context create request and a response to transfer context from the I-SMF 805 to the new I-SMF 820. In some embodiments, the signaling exchange may occur between the old I-SMF 805 and the new I-SMF 820.

In 955, the I-SMF 820 and the UPF 815 perform a signaling exchange to establish a N4 session. In 960, the I-SMF 820 transmits application relocation information to the AF 250. For example, the I-SMF 820 may transmit a Nsmf_eventexposure_apprelocationinfo message to the AF 250 that includes a PDU session ID and the DNAI associated with the nDN 810. If a new PDU session is established additional signaling may be performed to update the AF 250 and other network functions with the new session information and a release of the old PDU session.

Figure 10:
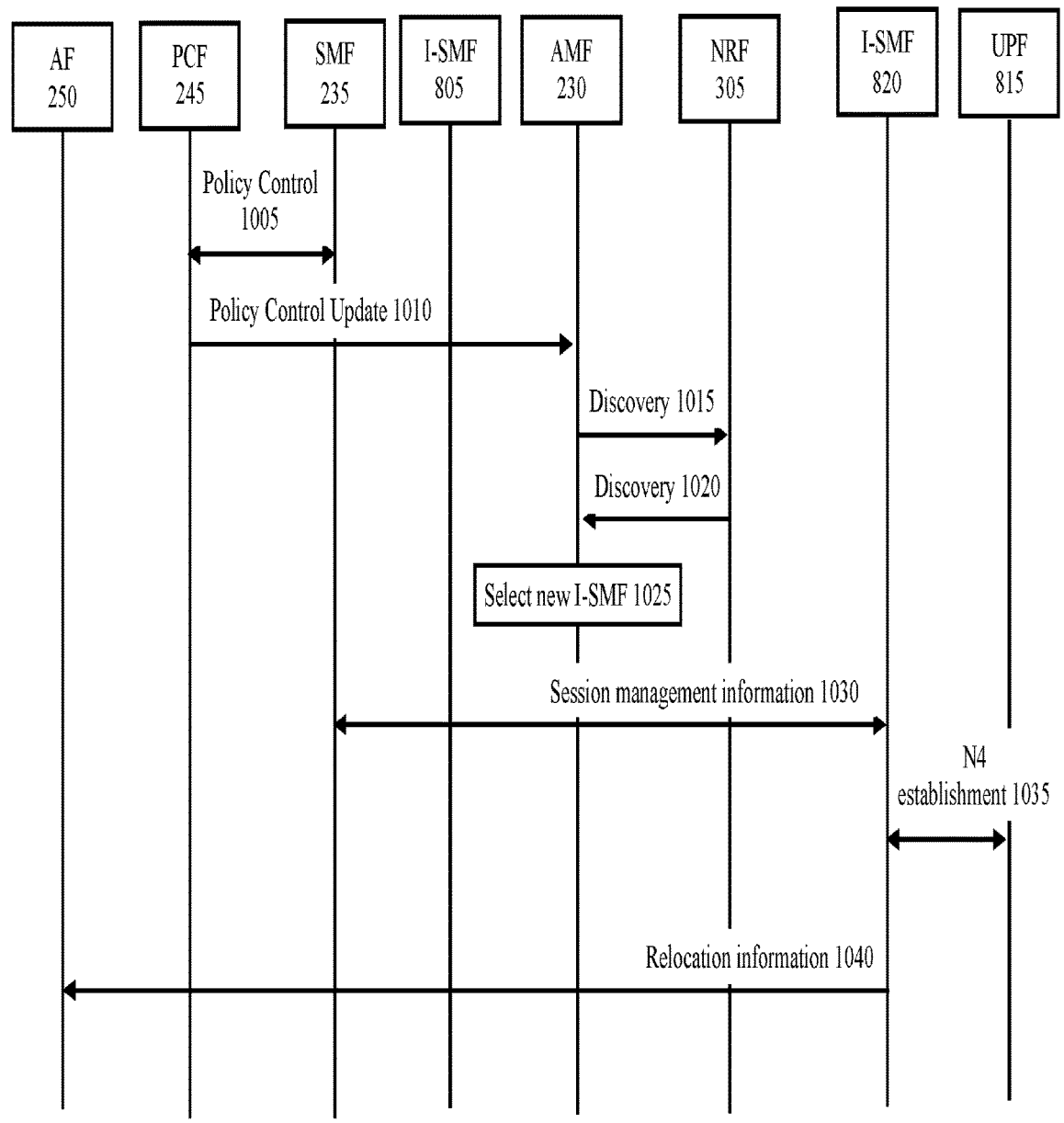
FIG. 10 shows a signaling diagram for a data network change that includes an I-SMF change initiated by the PCF according to various exemplary embodiments.

FIG. 10 shows a signaling diagram 1000 for a data network change that includes an I-SMF change initiated by the PCF according to various exemplary embodiments. The signaling diagram 1000 will be described with regard to the architecture arrangement 800 of FIG. 8 and the signaling diagram 900 of FIG. 9.

The signaling diagram 1000 relates to a scenario substantially similar to the scenario illustrated in the signaling diagram 900. However, in this example, the PCF 245 initiates the I-SMF change and an NRF 305 is utilized.

The signaling diagram 1000 occurs after 910-930 of the signaling diagram 900. Thus, only the AF 250, the PCF 245, the SMF 235, the I-SMF 805, the AMF 230, the NRF 305, the I-SMF 820 and the UPF 810 are illustrated in the signaling diagram 1000.

As described above, in 930, the UDR 902 sends a notification message to the PCF 245. For example, the UDR 902 may send a Nudr_DM_Notify message that includes the requested one or more DNAI, the AF service ID and the application identifier.

In 1005, the PCF 245 performs a policy control signaling exchange with the SMF 235. This may include the PCF 245 transmitting a policy control notification to the SMF 235. The policy control notification may include the requested DNAI. The SMF 235 may then send a response indicating that the SMF 235 and the I-SMF 805 are not configured to support a session with the requested DNAI.

In 1010, the PCF 245 transmits a policy control update to the AMF 230. This message may include the requested DNAI and a request to relocate the session to a new SMF.

In 1015, the AMF 230 initiates network function discovery with the NRF 305. For example, based on the message received from the PCF 245 the AMF 230 may assume that the SMF 235 and/or the I-SMF 805 cannot handle a session on the requested DNAI. This may trigger the AMF 230 to initiate SMF discovery. The discovery request may include the requested DNAI. The NRF 305 may then determine an I-SMF that can handle the current context along with the requested DNAI. For example, as described above with regard to FIG. 3 the NRF 305 may possess a mapping between AMF, SMF and DNAI. Thus, the NRF 305 may check a mapping table.

In 1020, the NRF 305 transmits a response to the AMF 230 that identifies an I-SMF that can handle the current context along with the requested DNAI. In this example, the AMF 230 identifies the I-SMF 420.

In 1025, the AMF 230 selects the new I-SMF (e.g. I-SMF 820) based on the information received from the NRF 305. In 1030, the I-SMF 820 performs a signaling exchange with the SMF 235. This may include a session management context create request and a response to transfer context from the I-SMF 805 to the new I-SMF 820. In some embodiments, the signaling exchange may occur between the old I-SMF 805 and the new I-SMF 820.

In 1035, the I-SMF 820 and the UPF 815 perform a signaling exchange to establish a N4 session. In 1040, the I-SMF 820 transmits application relocation information to the AF 250. For example, the I-SMF 820 may transmit a Nsmf_eventexposure_apprelocationinfo message to the AF 250 that includes a PDU session ID and the DNAI associated with the nDN 810. If a new PDU session is established additional signaling may be performed to update the AF 250 and other network functions with the new session information and a release of the old PDU session.

Figure 11:
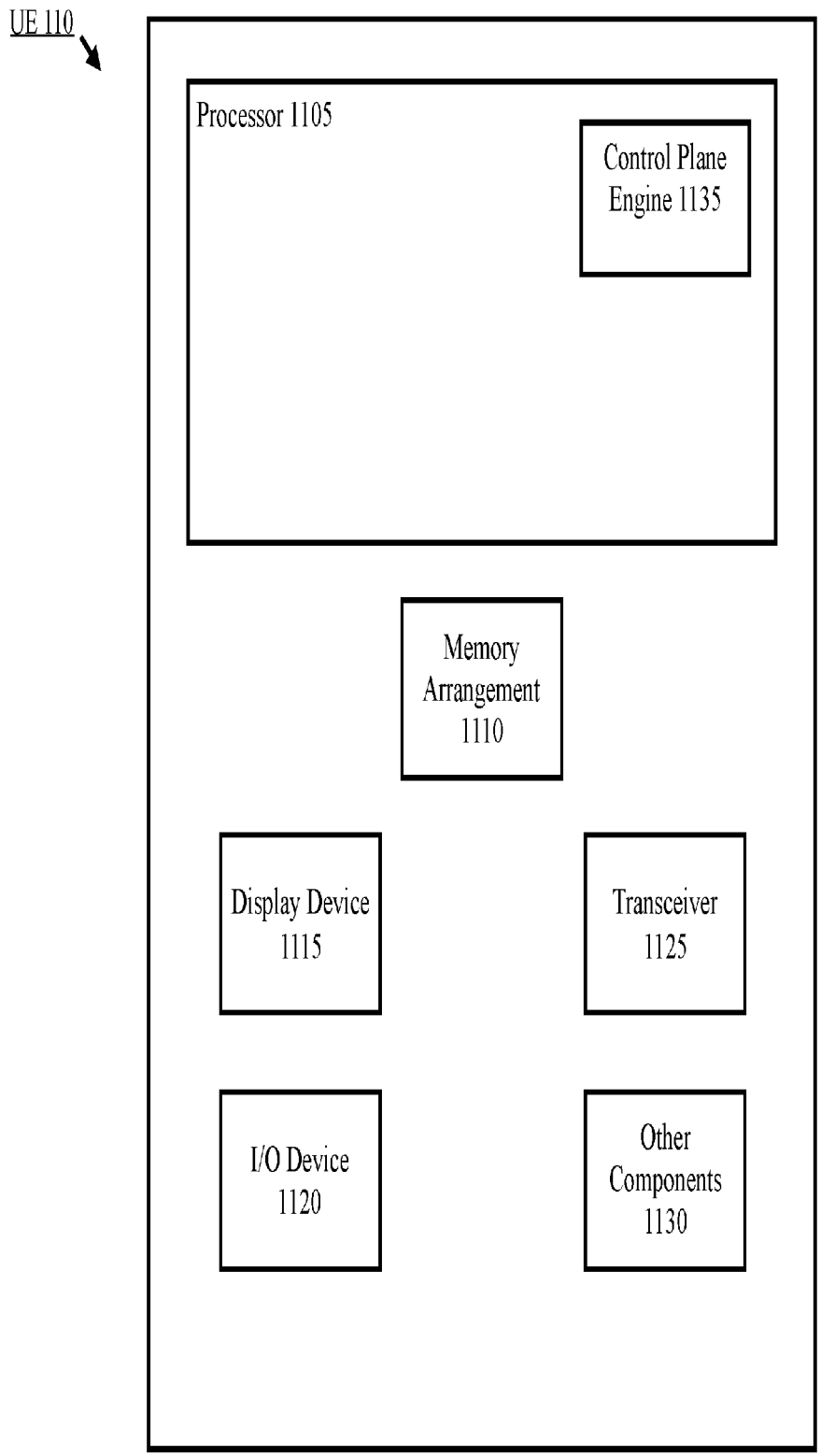
FIG. 11 shows an exemplary user equipment (UE) according to various exemplary embodiments.

FIG. 11 shows an exemplary user equipment (UE) 110 according to various exemplary embodiments. The UE 110 will be described with regard to the network arrangement 100 of FIG. 1. The UE 110 may represent any electronic device and may include a processor 1105, a memory arrangement 1110, a display device 1115, an input/output (I/O) device 1120, a transceiver 1125, and other components 1130. The other components 1130 may include, for example, a SIM card, an audio input device, an audio output device, a battery that provides a limited power supply, a data acquisition device, ports to electrically connect the UE 110 to other electronic devices, etc.

The processor 1105 may be configured to execute a plurality of engines of the UE 110. For example, the engines may include a control plane engine 1135. The control plane engine 1135 may perform various operations related to establishing and maintaining a connection to a local area data network.

The above referenced engine being an application (e.g., a program) executed by the processor 1105 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 1105 is split among two or more processors such as a baseband processor and an applications processor. The exemplary embodiments may be implemented in any of these or other configurations of a UE.

The memory arrangement 1110 may be a hardware component configured to store data related to operations performed by the UE 110. The display device 1115 may be a hardware component configured to show data to a user while the I/O device 1120 may be a hardware component that enables the user to enter inputs. The display device 1115 and the I/O device 1120 may be separate components or integrated together such as a touchscreen. The transceiver 1125 may be a hardware component configured to establish a connection with the 5G NR-RAN 120, the WLAN 122, etc. Accordingly, the transceiver 1125 may operate on a variety of different frequencies or channels (e.g., set of consecutive frequencies).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at an access and mobility management function of a cellular network:
        identifying a session between a first data network and a user equipment (UE), wherein the session is served by a session management function (SMF);
        receiving data network access information (DNAI) from the SMF;
        receiving an indication of at least one SMF from a network repository function (NRF), wherein the NRF stores a mapping between a set of DNAI and one or more SMFs; and
        selecting, based on at least the indication, an intermediate SMF (I-SMF) to be inserted into the session based on the indication.

2. The method of claim 1, wherein receiving the DNAI from the SMF triggers the AMF to perform I-SMF reselection.

3. The method of claim 1, wherein receiving the DNAI from the SMF triggers the AMF to perform I-SMF selection.

4. The method of claim 1, further comprising:
    transmitting a discovery request to the NRF for SMFs to be added to a packet data unit (PDU) session.

5. The method of claim 4, wherein the indication of the at least one SMF is provided to the AMF in response to the discovery request.

6. The method of claim 1, wherein the SMF receives the DNAI from a policy and control function (PCF) prior to providing it to the AMF.

7. The method of claim 1, wherein the cellular network is a fifth generation (5G) network.

8. One or more processors of an access and mobility management function of a cellular network configured to perform operations, the operations comprising:
    identifying a session between a first data network and a user equipment (UE), wherein the session is served by a session management function (SMF);
    receiving data network access information (DNAI) from the SMF;
    receiving an indication of at least one SMF from a network repository function (NRF), wherein the NRF stores a mapping between a set of DNAI and one or more SMFs; and
    selecting, based on at least the indication, an intermediate SMF (I-SMF) to be inserted into the session based on the indication.

9. The one or more processors of claim 8, wherein receiving the DNAI from the SMF triggers the AMF to perform I-SMF reselection.

10. The one or more processors of claim 8, wherein receiving the DNAI from the SMF triggers the AMF to perform I-SMF selection.

11. The one or more processors of claim 8, further comprising:

transmitting a discovery request to the NRF for SMFs to be added to a packet data unit (PDU) session.

12. The one or more processors of claim 11, wherein the indication of the at least one SMF is provided to the AMF in response to the discovery request.

13. The one or more processors of claim 8, wherein the SMF receives the DNAI from a policy and control function (PCF) prior to providing it to the AMF.

14. The one or more processors of claim 8, wherein the cellular network is a fifth generation (5G) network.

15. A fifth-generation system (5GS) comprising:
an access and mobility management function (AMF) configured to i) identify a session between a first data network and a user equipment (UE), ii) receive data network access information (DNAI) from a session management function (SMF) and iii) select an intermediate SMF (I-SMF) to be inserted into the session; and
a network repository function (NRF) configured to i) store a mapping between a set of DNAI and one or more SMFs and ii) transmit an indication of one or more SMFs to the AMF.

16. The 5GS of claim 15, wherein the SMF is configured to determine whether the SMF serves the DNAI.

17. The 5GS of claim 16, wherein when the SMF transmits the DNAI to the SMF to trigger the AMF to perform I-SMF reselection.

18. The 5GS of claim 16, wherein when the SMF transmits the DNAI to the SMF to trigger the AMF to perform I-SMF selection.

19. The 5GS of claim 15, wherein the SMF receives the DNAI from a policy and control function (PCF) of the 5GS prior to providing it to the AMF.

20. The 5GS of claim 15, wherein the AMF is further configured to transmit a discovery request to the NRF for SMFs to be added to a packet data unit (PDU) session.

* * * * *